(12) United States Patent
Chen et al.

(10) Patent No.: US 8,744,513 B2
(45) Date of Patent: Jun. 3, 2014

(54) INTERACTION BETWEEN MAXIMUM POWER REDUCTION AND POWER SCALING IN WIRELESS NETWORKS

(75) Inventors: Wanshi Chen, San Diego, CA (US); Tao Luo, San Diego, CA (US); Peter Gaal, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 161 days.

(21) Appl. No.: 13/168,840

(22) Filed: Jun. 24, 2011

(65) Prior Publication Data

US 2011/0319120 A1 Dec. 29, 2011

Related U.S. Application Data

(60) Provisional application No. 61/359,779, filed on Jun. 29, 2010.

(51) Int. Cl.
*H04B 7/00* (2006.01)
*H04B 1/04* (2006.01)

(52) U.S. Cl.
USPC .......................... 455/522; 455/120; 455/125

(58) Field of Classification Search
USPC ............ 455/102, 120, 125, 127.1–127.5, 522
See application file for complete search history.

(56) References Cited

U.S. PATENT DOCUMENTS

2005/0208960 A1* 9/2005 Hassan .......................... 455/522
2007/0111681 A1* 5/2007 Alberth et al. ............. 455/127.1
2008/0207150 A1* 8/2008 Malladi et al. ............. 455/127.1
2010/0093387 A1* 4/2010 Chen et al. .................... 455/522
2010/0118825 A1* 5/2010 Kawamura et al. ........... 370/330
2010/0291963 A1* 11/2010 Patel et al. ..................... 455/522
2012/0188947 A1* 7/2012 Larsson et al. ................ 370/328

FOREIGN PATENT DOCUMENTS

EP 1901442 A2 3/2008

OTHER PUBLICATIONS

Motorola: "Power Scaling for LTE-A", 3GPP Draft; R1-103169-Power Scaling for LTE-A-, 3RD Generation Partnership Project (3GPP), MOB1 LE Competence Centre ; 650, Route Des Lucioles ; F-06921 Sophia-Anti Polis Cedex ; France, vol. RAN WG1, No. Montreal, Canada; 20100510, May 7, 2010, XP050420386, [retrieved on May 7, 2010].

(Continued)

*Primary Examiner* — Ping Hsieh
*Assistant Examiner* — Xin Jia
(74) *Attorney, Agent, or Firm* — Seyfarth Shaw LLP

(57) ABSTRACT

Methods, apparatuses, and articles of manufacture are disclosed for adjusting a power level in connection with transmitting parallel uplink channels. In one aspect, a user equipment determines a power-limited condition in which a total transmit power of a group of power-controlled channels exceeds a maximum level in a transmission subframe. The user equipment may determine, in an iterative fashion, power backoff values by which to establish a configured maximum power level. The parallel uplink channels in the group may be prioritized and different backoff values may be used with channels having different priorities. The user equipment may thereafter adjust a transmit power of the power-controlled channels based on the configured maximum power level.

36 Claims, 7 Drawing Sheets

(56) References Cited

OTHER PUBLICATIONS

Nokia Siemens Networks et al: "Remaining issues on uplink power control", 3GPP Draft; R1-103792_Remaining_Issues_On_UL_PC, 3rd Generation Partnership Project (3GPP), Mobile Competence Centre ; 650, Route Des Lucioles ; F-06921 Sophia-Anti Polis Cedex ; France, vol. RAN WG1, No. Dresden, Germany; 20100628, Jun. 22, 2010, XP050449219, [retrieved on Jun. 22, 2010] Chapters 2 and 4; pp. 2,4—p. 5.

Partial International Search Report—PCT/US2011/042058—ISA/EPO—Dec. 19, 2011.

International Search Report and Written Opinion—PCT/US2011/042058—ISA/EPO—Mar. 29, 2012.

\* cited by examiner

INTERACTION BETWEEN MAXIMUM POWER REDUCTION AND POWER SCALING IN WIRELESS NETWORKS

RELATED APPLICATIONS

Claim of Priority Under 35 U.S.C. §119

The present Application for patent claims priority to Provisional Application No. 61/359,779 entitled "Interaction Between Maximum Power Reduction and Power Scaling in Wireless Networks," filed Jun. 29, 2010, and assigned to the assignee hereof and hereby expressly incorporated by reference herein.

TECHNICAL FIELD

Embodiments of the present invention relate to wireless networks in general and, in particular, to the interaction between power reduction and power scaling in wireless networks.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Uplink transmitter power control in a mobile communication system balances the need for sufficient energy transmitted per bit to achieve a desired quality-of-service (e.g., data rate and error rate), against the need to minimize interference to other users of the system and to maximize the battery life of the mobile terminal. To accomplish this goal, uplink power control has to adapt to the characteristics of the radio propagation channel, including path loss, shadowing, fast fading and interference from other users in the same cell and adjacent cells.

In LTE Rel-8 and LTE Rel-9, uplink transmission is constrained to a single carrier (SC) waveform using a discrete Fourier transform spread orthogonal frequency division multiplex (DFT-S-OFDM) modulation scheme, which has a limited peak-to-average power ratio (PAPR). Additionally, control channel transmissions and data channel transmissions are never scheduled in the same subframe, and within each transmitted channel (control or data), allocated resource blocks are contiguous across the transmission bandwidth, resulting in a relatively uniform power spectral density across the transmission bandwidth in any given transmission subframe.

SUMMARY

Methods, apparatuses, and articles of manufacture are disclosed for comparing a total transmit power of a plurality of power-controlled channels with a maximum power level, where the plurality of power-controlled channels is configured for parallel transmission in an uplink subframe, determining a power backoff from the maximum power level when the total transmit power exceeds the maximum power level, iterating the power backoff based at least in part on a priority of channels in the plurality of power-controlled channels, and adjusting a transmit power of one or more channels in the plurality of power-controlled channels based on a last power backoff iteration.

In one aspect, determining the power backoff includes determining at least one control channel backoff and one or more data channel backoffs, where the total transmit power is less than or equal to the maximum power level.

In one aspect, iterating the power backoff includes iterating one or more data channel backoffs until a differential improvement in a performance metric is less than a predetermined value.

In one aspect, iterating the power backoff includes iterating one or more data channel backoffs until an absolute value of a performance metric is less than a predetermined value.

In one aspect, adjusting the transmit power includes scaling the one or more data channels for transmission according to a last power backoff iteration.

In one aspect, the power backoff is based on a performance metric associated with a power-frequency distribution of the plurality of power-controlled channels.

In one aspect, the plurality of power-controlled channels includes a control channel and a data channel in a component carrier.

In one aspect, the plurality of power-controlled channels includes two or more control channels in two or more component carriers.

In one aspect, the plurality of power-controlled channels includes two or more data channels in two or more component carriers.

In one aspect, the maximum power level comprises a first maximum power level for control channels and a second maximum power level for data channels, where the first and second maximum power levels are different power levels.

In one aspect, the maximum power level comprises a same power level for data channels and control channels.

DETAILED DESCRIPTION

Figure 1:
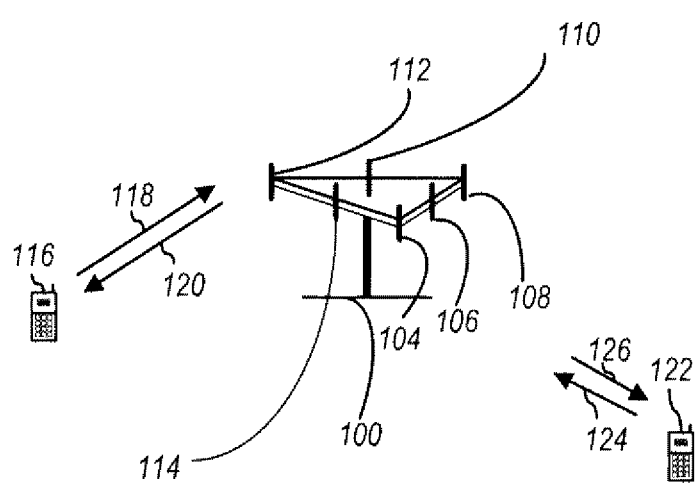
FIG. 1 illustrates a wireless communication system.

In the following description, for purposes of explanation and not limitation, details and descriptions are set forth in order to provide a thorough understanding of the subject matter. Various modifications will be readily apparent to those skilled in the art, and the principles described herein may be applied to such variations without departing from the spirit or scope of the disclosure.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various aspects of the disclosure may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

As shown in FIG. 1, a first user equipment 116 is may be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124 126 that are shown in FIG. 1 may use different frequencies for communication. For example, the first forward link 120 may use a different frequency than that used by the first reverse link 118.

Each group of antennas and/or the area in which they are designed to communicate may be referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 may utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

Communication networks accommodating some of the various aspects of the disclosure may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:

3G 3rd Generation
3GPP 3rd Generation Partnership Project
ACLR Adjacent channel leakage ratio
ACPR Adjacent channel power ratio
ACS Adjacent channel selectivity
ADS Advanced Design System
AMC Adaptive modulation and coding
A-MPR Additional maximum power reduction
ARQ Automatic repeat request
BCCH Broadcast control channel
BTS Base transceiver station
CCE Channel Control Element
CDD Cyclic delay diversity
CCDF Complementary cumulative distribution function
CDMA Code division multiple access
CFI Control format indicator
Co-MIMO Cooperative MIMO
CP Cyclic prefix
CPICH Common pilot channel
CPRI Common public radio interface
CQI Channel quality indicator
CRC Cyclic redundancy check
DCI Downlink control indicator
DFT Discrete Fourier transform
DFT-SOFDM Discrete Fourier transform spread OFDM
DL Downlink (base station to subscriber transmission)
DL-SCH Downlink shared channel
DSP Digital signal processing
DT Development toolset
DVSA Digital vector signal analysis
EDA Electronic design automation
E-DCH Enhanced dedicated channel
E-UTRAN Evolved UMTS terrestrial radio access network
eMBMS Evolved multimedia broadcast multicast service
eNB Evolved Node B
EPC Evolved packet core
EPRE Energy per resource element
ETSI European Telecommunications Standards Institute
E-UTRA Evolved UTRA
E-UTRAN Evolved UTRAN
EVM Error vector magnitude
FDD Frequency division duplex
FFT Fast Fourier transform
FRC Fixed reference channel
FS1 Frame structure type 1
FS2 Frame structure type 2
GSM Global system for mobile communication
HARQ Hybrid automatic repeat request
HDL Hardware description language
HI HARQ indicator
HSDPA High speed downlink packet access
HSPA High speed packet access
HSUPA High speed uplink packet access IFFT Inverse FFT
IOT Interoperability test
IP Internet protocol
LO Local oscillator
LTE Long term evolution
MAC Medium access control
MBMS Multimedia broadcast multicast service
MBSFN Multicast/broadcast over single-frequency network
MCH Multicast channel
MCS Modulation and Coding Scheme
MIMO Multiple input multiple output
MISO Multiple input single output
MME Mobility management entity
MOP Maximum output power
MPR Maximum power reduction
MU-MIMO Multiple user MIMO
NAS Non-access stratum
OBSAI Open base station architecture interface
OFDM Orthogonal frequency division multiplexing
OFDMA Orthogonal frequency division multiple access
PAPR Peak-to-average power ratio
PAR Peak-to-average ratio
PBCH Physical broadcast channel
P-CCPCH Primary common control physical channel
PCFICH Physical control format indicator channel
PCH Paging channel
PDCCH Physical downlink control channel
PDCP Packet data convergence protocol
PDSCH Physical downlink shared channel
PHICH Physical hybrid ARQ indicator channel
PHY Physical layer
PRACH Physical random access channel
PMCH Physical multicast channel
PMI Pre-coding matrix indicator
P-SCH Primary synchronization signal
PUCCH Physical uplink control channel
PUSCH Physical uplink shared channel
RB Resource Block
RBG Resource Block Group
RE Resource Element
REG Resource Element Group
RNTI Radio Network Temporary Identifier.

Figure 2:
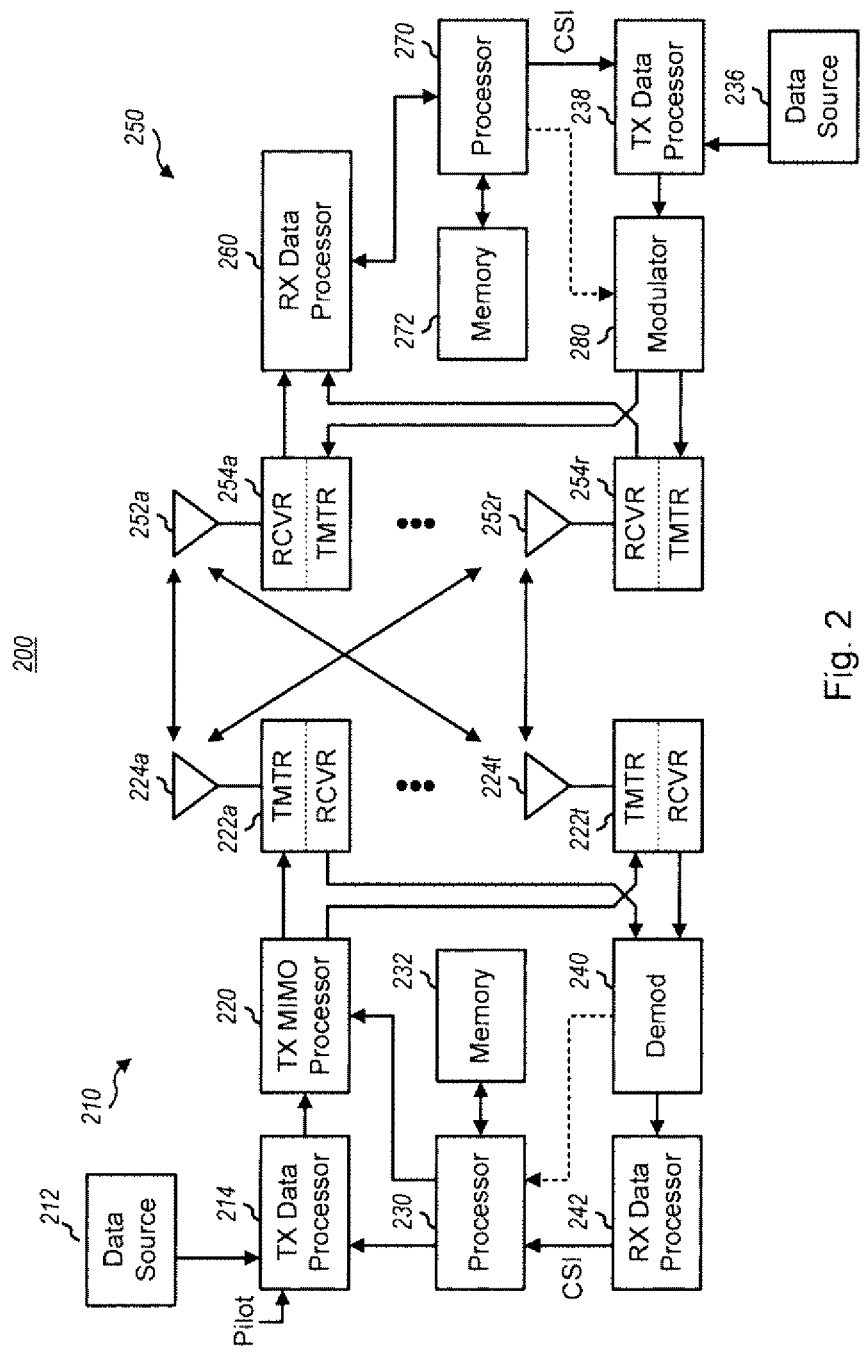
FIG. 2 illustrates a block diagram of an exemplary wireless communication system.

FIG. 2 illustrates a block diagram of an exemplary MIMO communication system 200. As illustrated, MIMO communication system 200 comprises a transmitter system 210 (e.g., a base station or access point) and a receiver system 250 (e.g., an access terminal or user equipment). It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2.

At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. The conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

A channel response estimate may be generated by the RX data processor 260. The channel response estimate can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

Processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In MIMO communication system 200, the receiver system 250 may be capable of receiving and processing spatially multiplexed signals. In these cases, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. When receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 may contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

MIMO communication system 200 may also be configured to utilize transmit diversity schemes. With transmit diversity, the same data stream is transmitted across the transmitter system antennas 224a through 224t. The data rate delivered to receiver system 250 is typically lower than spatially multiplexed MIMO communication systems 200. Transmit diversity can provide robustness and improved reliability. In transmit diversity systems each of the signals transmitted from the transmitter system antennas 224a through 224t may experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

A combination of spatial multiplexing and transmit diversity may also be utilized. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. The rank index may be set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. The processor 230 of the transmitter system 210 then determines which pre-coding matrix to use for future forward link transmissions, and then processes the extracted message. The processor 230 may alternatively use the received signal to adjust the beamforming weights for future forward link transmissions.

A reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

Processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

LTE Advanced (Rel-10 and beyond) supports carrier aggregation using multiple, possibly non-contiguous component carriers (CCs) with relaxed waveform constraints in each component carrier such as clustered (i.e., non-contiguous) resource block allocations and concurrent transmission of control and data channels in one or more component carriers in a given subframe. These relaxed constraints, representing departures from a single-carrier waveform, could result in different, nonuniform power distributions across the transmission bandwidth for any total transmit power. Each different power distribution may produce intermodulation products in different parts of the spectrum that may require different amounts of power backoff from subframe to subframe. Also, the PAPR of the uplink transmission may be increased over the single-carrier waveform case due (at least in part) to the concurrent transmission of data and control channels using different power levels and modulation schemes (e.g., QPSK for control channels and 16-QAM or 64-QAM for data channels). Variations in the PAPR (usually represented by a performance parameter called the "cubic metric," or CM) may also require different amounts of power backoff from subframe to subframe.

Another factor affecting power-control is that control channels and data channels may have different error-tolerance (i.e., quality of service—QOS) limits, which translates to different transmit power levels. Control channels must be received and decoded with very high reliability, while erroneously decoded data can be repeated using well-defined hybrid automatic repeat request (HARQ) procedures with ACK/NAK signaling as is known in the art. Data channels with uplink control information (UCI) fall between the high priority of pure control channels and the lower priority of pure data channels. The scheduling of uplink control and data transmissions is determined by downlink control information (DCI) sent to the UE by the base station (eNodeB) on one or more downlink control channels. The DCI may also include open-loop and closed-loop power control parameters that request specific transmit power levels and power level adjustments from the UE in order to meet the respective QOS requirements of the scheduled control and data channel transmissions. As a result, there is a potential conflict between the total transmit power requested by the base station to meet QOS requirements, the power capability of the UE and the power backoff needed to meet limits on spurious emissions imposed on the UE and to account for the PAPR of the transmission waveform.

Figure 3:
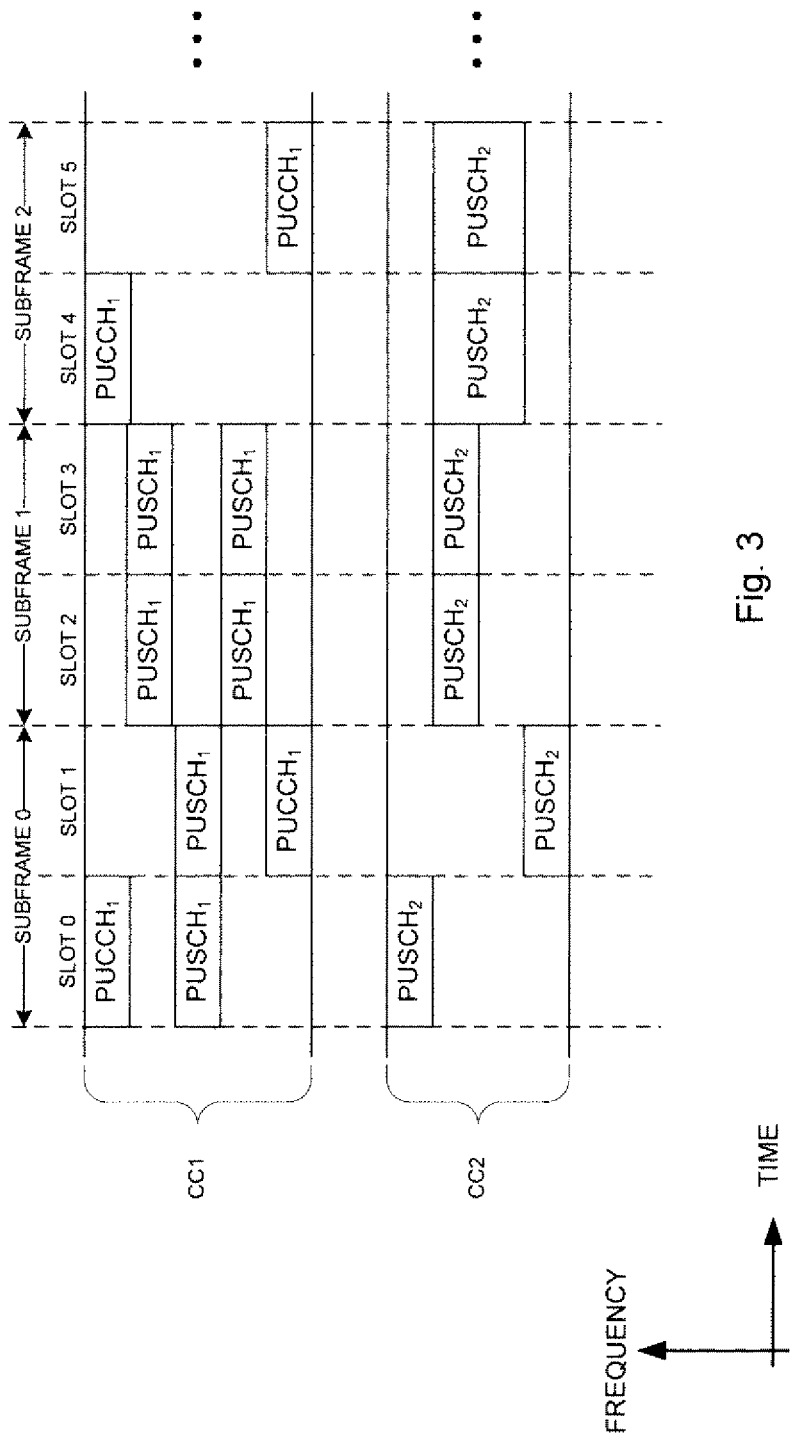
FIG. 3 illustrating an exemplary configuration of component carriers.

FIG. 3 illustrates an exemplary uplink carrier aggregation configuration using two component carriers, CC1 and CC2. FIG. 3 illustrates the first three subframes in an exemplary LTE radio frame, where each subframe includes two slots. It will be appreciated that more than two carriers may be aggregated at any given time. It will also be appreciated that one or more component carriers may be inactive at any given time. For example, in FIG. 3 CC1 may be active and CC2 may be inactive at any given time.

As illustrated in FIG. 3, the scheduled channel configurations in component carriers CC1 and CC2 may change from subframe to subframe. For example, in subframe 0, CC1 may be scheduled for a frequency hopping control channel $PUCCH_1$ and a data channel $PUSCH_1$, while CC2 may be scheduled for only a frequency hopping data channel $PUSCH_2$. In subframe 1, component carrier CC1 may be scheduled for only a non-contiguous data channel $PUSCH_1$, while component carrier CC2 may be scheduled for a contiguous data channel $PUSCH_2$. In subframe 2, component carrier CC1 may be scheduled only for a frequency hopping control channel $PUCCH_1$ while component carrier CC2 may be scheduled only for a data channel $PUSCH_2$ with an allocated bandwidth that is larger (or smaller) than a previous subframe.

These examples illustrate that in any given subframe, the UE may be scheduled by the base station to transmit parallel data and control channels, parallel control channels and/or parallel data channels, which may be contiguous or non-contiguous, where each scheduled channel is associated with a power control command from the base station. As noted above, the power and frequency distribution requested and scheduled by the base station, respectively, may be inconsistent with the power limitations of the UE and the transmission mask specified for the UE. Therefore, the UE may be configured to perform a power backoff procedure to achieve an appropriate level of spurious emissions and to meet QOS priorities among the various uplink channels.

In general, the power backoff procedure may be iterative. A power backoff based on channel priorities can alter the power-frequency profile of the resulting waveform, which in turn can change the amplitudes of the intermodulation products and the PAPR of the waveform—requiring a further power adjustment. Such iterative adjustments could be increases or decreases in power backoff, depending on the specific characteristics of the resulting waveform. This process may be repeated until some selected performance metric is satisfied. For example, the procedure could be terminated when the change in power between successive iterations is less than some predefined value, or some metric associated with the waveform, such as the cubic metric, stabilizes within some predefined limits.

In the following description, let:

$P_{MAXc}$=maximum transmit power of component carrier c.

$$P_{MAX} = \text{maximum } UE \text{ transmit power across all component carriers} = \sum_c P_{MAXc}$$

$MPR_c$ maximum power reduction of component carrier c $$MPR = \text{maximum power reduction across all component carriers} = \sum_c MPR_c$$

$P_{CMAXc}=P_{MAXc}-MPR_c$=configured maximum power of component carrier c $P_{CMAX}$=configured maximum UE power=$P_{MAX}-MPR=\Sigma(P_{MAXc}-MPR_c)$ $P_{PUCCHc}$=PUCCH power on component carrier c $P_{PUCCH}=\Sigma P_{PUCCHc}$=total PUCCH power across all component carriers $P_{PUSCHc}$=PUSCH power on component carrier c $$P_{PUSCH} = \sum_c P_{PUSCHc} = \text{total } PUSCH \text{ power across all component carriers}$$

$P_{(PUSCH+UCI)c}$=power of PUSCH with UCI on component carrier c $$P_{PUSCH+UCI} = \sum_c P_{(PUSCH+UCI)c} =$$

total power of PUSCH with UCI across all component carriers

As described above, a UE receives downlink control information (DCI) from a base station that may include uplink resource allocations for parallel transmissions of one or more control and/or data channels on one or more component carriers, along with power control commands for each of the allocated channels.

For a control channel on component carrier c in subframe (i), the power control command may take the form:

$P_{PUCCHc}(i) = P_{O\_PUCCH} + PL_c + h(n_{CQI}, n_{HARQ}) + \Delta_{F\_PUCCH}(F) + g(i)$ where $\Delta_{F\_PUCCH}$ (F) is a PUCCH format dependent value provided by higher layers, h(n) is a PUCCH format dependent value where $n_{CQI}$ corresponds to the number of bits (if any) allocated to channel quality information in the PUCCH format and $n_{HARQ}$ is the number of HARQ bits (if any). $P_{O\_PUCCH}$ is a parameter composed of the sum of a cell specific parameter $P_{O\_NOMINAL\_PUCCH}$ provided by higher layers and a UE specific component $P_{O\_UE\_PUCCH}$. The parameter g(i) is an accumulative power control command for the PUCCH, where $$g(i) = g(i-1) + \sum_{m=0}^{M-1} \delta_{PUCCH}(i - k_m),$$

where g(i) is the current PUCCH power control adjustment state, and where $\delta_{PUCCH}$ is a UE specific correction value.

Similarly, for a data channel on component carrier c in subframe (i), with or without UCI, the power control command may take the form:

$P_{PUSCHc}(i) = 10 \log_{10}(M_{PUSCHc}(i)) + P_{O\_PUSCH_c}(j) \cdot PL_c + \Delta TF_c(i) + f_c(i)$ where $M_{PUSCHc}(i)$ is a bandwidth factor based on the number of allocated PUSCH resource blocks in subframe (i), $P_{O\_PUSCHc}(j)$ is the sum of a cell-specific nominal component provided from higher layers and a UE-specific component provided by higher layers, and (j) is a parameter indicating a semi-persistent, a dynamically scheduled resource grant or a PUSCH (re)transmission corresponding to a random access response grant. $PL_c$ is a downlink path-loss estimate calculated in the UE and α(j) is a scaling factor provided from higher layers. The transport format parameter $\Delta_{TF}(i)$ is dependent on the modulation and coding scheme. The parameter $f(i)$ is an accumulative power control (APC) command, where $f(i)=f(i-1)+\delta_{PUSCH}(i-K_{PUSCH})$, and where $\delta_{PUSCH}$ is a UE specific correction value, also referred to as a transmit power control (TPC) command. $K_{PUSCH}$ is a timing offset factor associated with the PDCCH and the adjustment of the transmit power.

The total uplink transmit power requested by the base station in subframe (i) across all component carriers is given by $$P_T(i) = \sum_c P_{PUCCHc}(i) + \sum_c P_{PUSCHc}(i)$$

In one aspect, there may be at most one PUCCH among all component carriers in an given subframe (i).

If the total power $P_T(i)$ requested by the base station for all of the allocated channels is less than $P_{MAX}$, the maximum power limit of the UE, then the UE can determine a power backoff value (MPR) from a lookup table that parametizes the power-frequency profile of the uplink waveform, for example, in terms of its overall bandwidth, frequency continuity, power variations across the allocated bandwidth and the modulation schemes used for the control and data channels. Such a lookup table may be UE specific, based on a characterization of the UE's transmit chain and power amplifier. The resultant value of MPR can be subtracted from $P_{MAX}$ to determine a value of $P_{CMAX}$ and the transmit power can be selected as min$\{P_{CMAX}(i), P_T(i)\}$.

If the total power $P_T(i)$ requested by the base station for all of the allocated channels is greater than $P_{MAX}$, then the UE may be configured to perform iterative power scaling and MPR estimates. In one aspect, the power backoff procedure may be based on a channel priority where control channels (PUCCH) are prioritized over data channels with uplink control information (PUSCH_UCI), which are prioritized over data channels without UCI (PUSCH). The channel priorities may be applied both within a given component carrier and across multiple component carriers.

If the power requested for control channels across all component carriers, $$P_{PUCCH} = \sum_c P_{PUCCHc}$$

is less than $P_{MAX}$, then an initial estimate for MPR can be made assuming that the control channels are the only channels to be transmitted, based on the same or similar parametized waveform characteristics described above (e.g., bandwidth, power variation, frequency continuity and modulation). The initial MPR estimate can then be used to determine an initial value of $P_{CMAX}(n)=P_{MAX}-MPR(n)$, where n is an iteration index equal to 1 for the initial estimate, and the power of the control channels can be determined as:

$$P_{PUCCH}(i) = \min\left\{P_{CMAX}(1), \sum_c P_{PUCCHc}(i)\right\}$$

If $\sum_c P_{PUCCHc}(i) < P_{CMAX}$, then the remaining power can be allocated to data channels according to:

$$\sum_c w_c \cdot P_{PUSCHc}(i) \leq P_{CMAX}(n) - \sum_c P_{PUCCHc}(i)$$

where $w_c$ is a uniform or weighted power-scaling factor for the PUSCH on carrier c. In one exemplary case, where the headroom above the allocated PUCCH power is inadequate, the power of one or more data channels may be scaled to zero.

If data channels with UCI are also allocated to the UE by the base station, then in the preceding formula, $$\sum_c P_{PUCCHc}(i)$$

can be replaced with $$\sum_c P_{PUCCHc}(i) + \sum_c P_{(PUSCHc+UCIc)}(i).$$

After the first power scaling iteration, the pending waveform will have a different power-frequency profile in terms of the bandwidth, frequency continuity, power variation and relative modulation levels and will map to a different MPR in the parameter-based lookup table.

If the power headroom is adequate, the new MPR may require another iteration of power scaling where the data channels are adjusted according to:

$$\sum_c w_c \cdot P_{PUSCH_c}(i) \le P_{CMAX}(n+1) - \sum_c P_{PUCCHc}(i)$$

This procedure may be repeated until the change in MPR or the change in $P_{CMAX}$ from iteration n to iteration n+1 is less than some predefined threshold (e.g., 0.2 dB to 0.5 dB). That is, a condition may be defined, such that when $$|P_{CMAX}(n+1) - P_{CMAX}(n)| \le \delta$$

(or equivalently, $|MPR(n+1) - MPR(n)| \le \delta$) the procedure is terminated and the power levels of the allocated channels are adjusted to the level of the last iteration and transmitted on the uplink.

In one aspect, a different $P_{CMAX}$ may be defined separately for control channels and data channels. The $P_{CMAX}$ defined for the control channels may be greater than the $P_{CMAX}$ defined for the data channels, reflecting an implicit priority of control channels over data channels.

Figure 4:
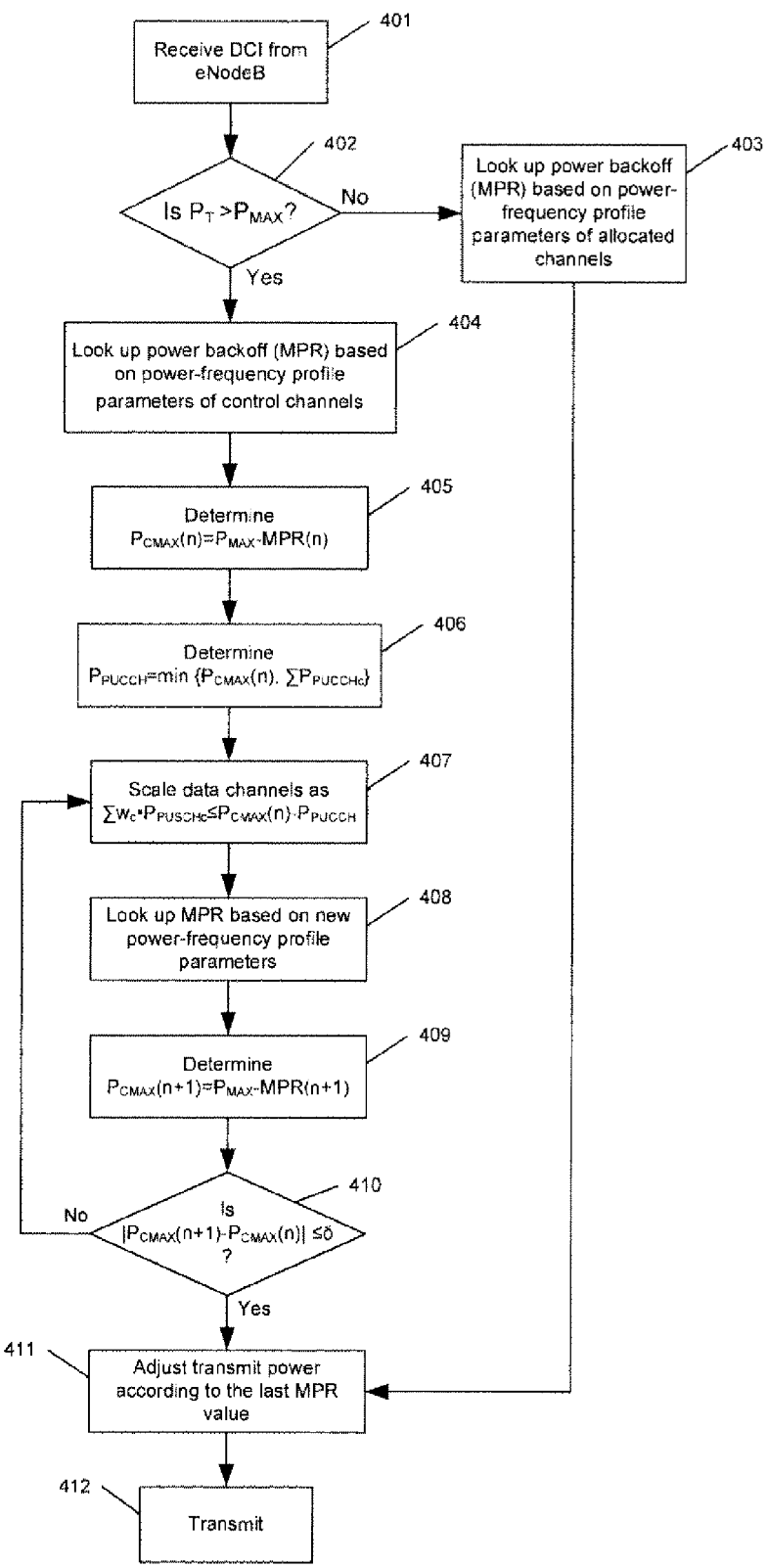
FIG. 4 is a flowchart illustrating an exemplary procedure.

An exemplary iterative procedure for determining a configured transmit power is detailed in the flowchart 400 of FIG. 4. In operation 401, a UE receives downlink control information (DCI) for a subframe from a base station (the subframe notation (i) is omitted). At operation 402, if the total power of all channels allocated by the base station ($P_T$) is less than the maximum power of the UE ($P_{MAX}$), the UE looks up a power backoff value (MPR) based on the power-frequency profile parameters of the allocated channels and, in operations 411 and 412, respectively, adjusts the power of the allocated channels according to the MPR value and transmits the allocated channels at the adjusted power level.

At operation 402, if the total power of all channels allocated by the base station ($P_T$) is greater than the maximum power of the UE ($P_{MAX}$), then the UE may look up a power backoff value (MPR) based on the power-frequency profile parameters of the allocated control channels. In operation 405, the UE determines a value of $P_{CMAX}$ as the difference between $P_{MAX}$ for the UE and the MPR value determined in operation 404. In operation 406, the UE selects a value for the total power of all the allocated control channels as the minimum of $P_{CMAX}$ (from operation 405) and the total control channel power initially allocated by the base station ($\Sigma P_{PUCCHc}$). In operation 407, the allocated data channels are scaled within the headroom between $P_{CMAX}$ and $P_{PUSCH}$. In operation 408, the UE looks up a new value of MPR based on the power-frequency profile parameters associated with the power-scaled waveform of operation 407. In operation 409, the UE determines a new value of $P_{CMAX}$ based on the new value of MPR from operation 408. In operation 410 the UE determines if the difference between the last two values (iterations) of $P_{CMAX}$ is less than a predefined value. If the difference is less than or equal to the predefined value, then the UE adjusts the power of the allocated channels according to the last value of $P_{CMAX}$ in operation 411 and transmits the adjusted channels in operation 412. If, in operation 410, the difference is greater than the predefined value, the UE rescales the data channel power based on the iterated value of $P_{CMAX}$ at operation 407, and the operation continues at operation 408 as described above.

Figure 5:
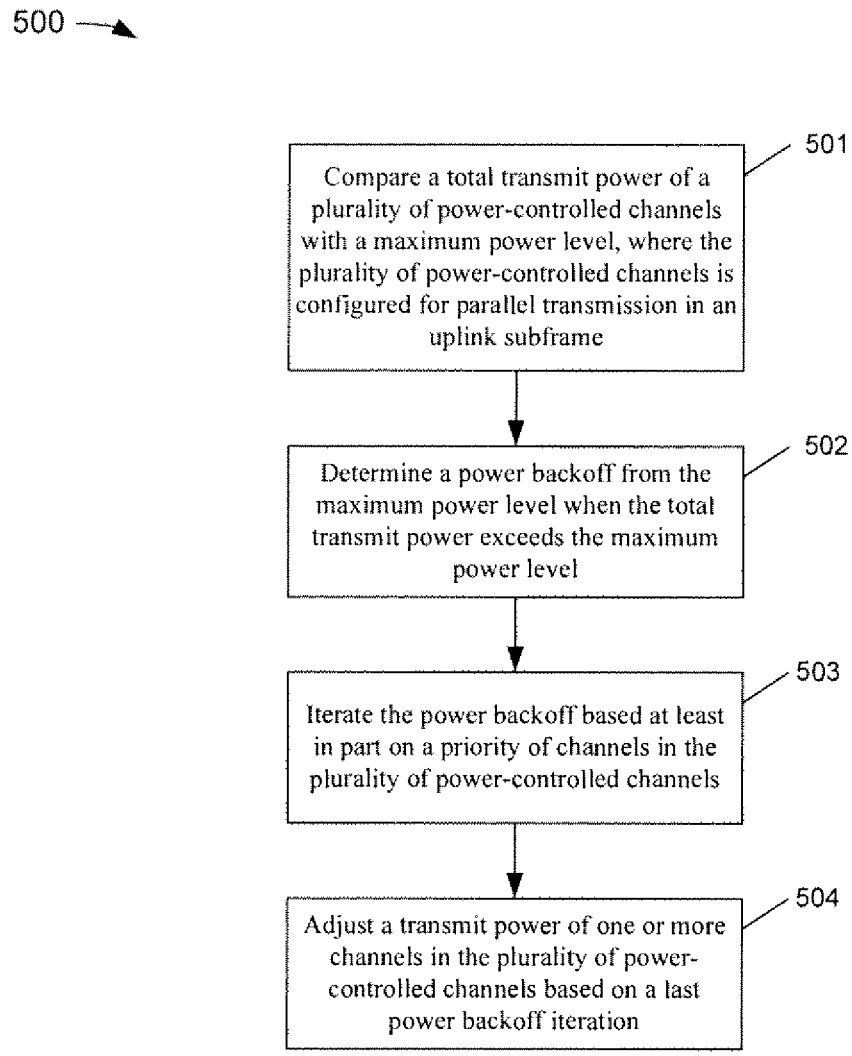
FIG. 5 is a flowchart illustrating an exemplary method.

FIG. 5 is a flowchart 500 illustrating an exemplary method in a UE for iteratively determining a power level and/or power reduction in connection with parallel uplink transmissions. In operation 501, the UE compares a total transmit power of a plurality of power-controlled channels with a maximum power level, where the plurality of power-controlled channels is configured for parallel transmission in an uplink subframe. In operation 502, the UE determines a power backoff from the maximum power level when the total transmit power exceeds the maximum power level. In operation 503, the UE iterates the power backoff based at least in part on a priority of channels in the plurality of power-controlled channels. And, in operation 504, the UE adjusts a transmit power of one or more channels in the plurality of power-controlled channels based on a last power backoff iteration.

Figure 6:
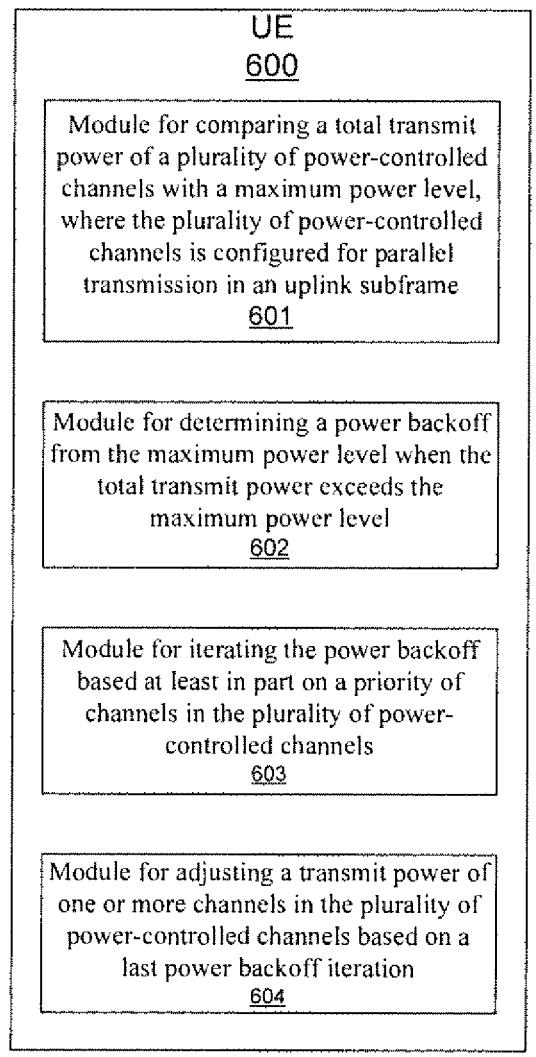
FIG. 6 is a functional block diagram illustrating an exemplary user equipment.
Figure 7:
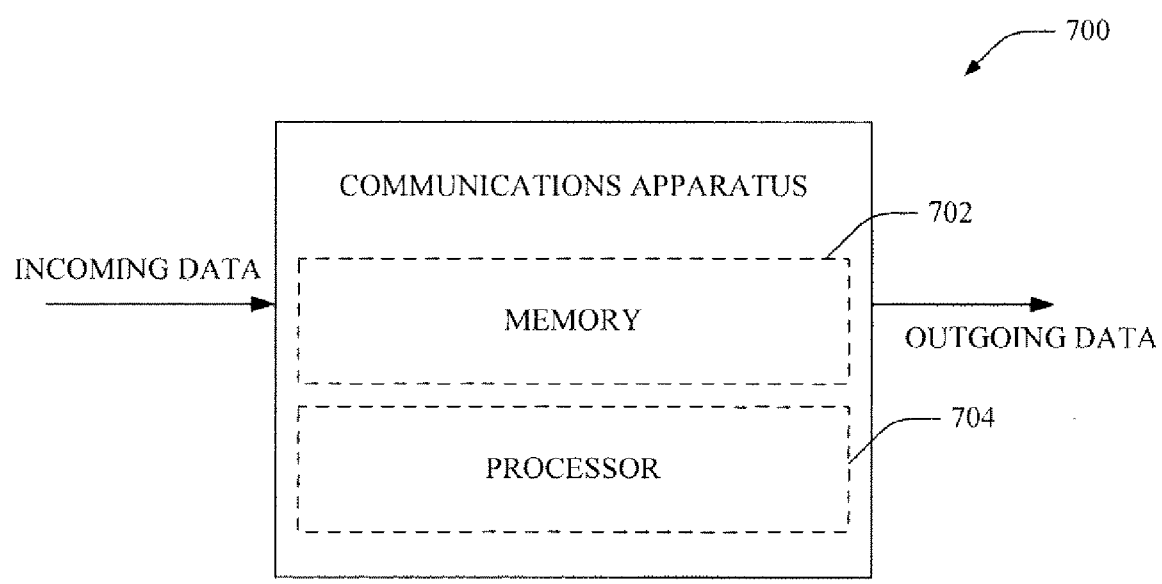
FIG. 7 is an exemplary apparatus capable of implementing various embodiments.

FIG. 6 is a block diagram of a UE 600 configured to perform the method of FIG. 5. UE 600 includes a module 601 for comparing a total transmit power of a plurality of power-controlled channels with a maximum power level, where the plurality of power-controlled channels is configured for parallel transmission in an uplink subframe. UE 600 also includes a module 602 for determining a power backoff from the maximum power level when the total transmit power exceeds the maximum power level. UE 600 includes a module 603 for iterating the power backoff based at least in part on a priority of channels in the plurality of power-controlled channels. UE 600 mat also include a module 604 for adjusting a transmit power of one or more channels in the plurality of power-controlled channels based on a last power backoff iteration FIG. 7 illustrates an apparatus 700 within which aspects of the present disclosure may be implemented. In particular, the apparatus 700 that is shown in FIG. 7 may comprise at least a portion of a user equipment such as UE 600 illustrated in FIG. 6 and/or at least a portion of a transmitter system or a receiver system such as the transmitter system 210 and the receiver system 250 that are depicted in FIG. 2. The apparatus 700 that is depicted in FIG. 7 can be resident within a wireless network and receive incoming data via, for example, one or more receivers and/or the appropriate reception and decoding circuitry (e.g., antennas, transceivers, demodulators and the like). The apparatus 700 that is depicted in FIG. 7 can also transmit outgoing data via, for example, one or more transmitters and/or the appropriate encoding and transmission circuitry (e.g., antennas, transceivers, modulators and the like). Additionally, or alternatively, the apparatus 700 that is depicted in FIG. 7 may be resident within a wired network.

FIG. 7 further illustrates that the apparatus 700 can include a memory 702 that can retain instructions for performing one or more operations, such as signal conditioning, analysis and the like. Additionally, the apparatus 700 of FIG. 7 may include a processor 704 that can execute instructions that are stored in the memory 702 and/or instructions that are received from another device. The instructions can relate to, for example, configuring or operating the apparatus 700 or a related communications apparatus. It should be noted that while the memory 702 that is depicted in FIG. 7 is shown as a single block, it may comprise two or more separate memories that constitute separate physical and/or logical units. In addition, the memory while being communicatively connected to the processor 704, may reside fully or partially outside of the apparatus 700 that is depicted in FIG. 7. It is also to be understood that one or more components, such as the UE 600 depicted in FIG. 6 can exist within a memory such as memory 702.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 700 of FIG. 7 can be employed as a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment. In the alternative, the processor and the storage medium may reside as discrete components in a user equipment. Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method, comprising:
    comparing a total transmit power of a plurality of power-controlled channels with a maximum power level, wherein the plurality of power-controlled channels comprise control channels and data channels configured for parallel control and data transmission in an uplink subframe;
    looking up an initial power backoff value to be subtracted from the maximum power level based at least in part on power-frequency profile parameters of the allocated control channels when the total transmit power exceeds the maximum power level;
    iterating the power backoff value and power-scaling until a change in the power backoff value is less than a predefined threshold, an iterated power backoff value being based at least in part on iterated power-scaling, and wherein iterating the power backoff value is based at least in part on a priority of channels in the plurality of power-controlled channels; and
    adjusting a transmit power of one or more channels in the plurality of power-controlled channels based on a result of iterating the power backoff value.

2. The method of claim 1, wherein looking up the initial power backoff value comprises looking up at least one control channel backoff value and one or more data channel backoff values, and wherein the total transmit power is less than or equal to the maximum power level.

3. The method of claim 2, wherein iterating the power backoff value comprises iterating the one or more data channel backoff values until a differential improvement in a performance metric is less than a predetermined value.

4. The method of claim 2, wherein iterating the power backoff value comprises iterating the one or more data channel backoff values until a performance metric is determined to be less than a predetermined value.

5. The method of claim 2, wherein adjusting the transmit power comprises scaling the one or more data channels for transmission in relation to a power level corresponding to the last power backoff value iteration.

6. The method of claim 1, wherein the power backoff value is based on a performance metric associated with a power-frequency distribution of the plurality of power-controlled channels.

7. The method of claim 1, wherein control channels are prioritized over data channels with uplink control information (UCI), which are prioritized over data channels without UCI.

8. The method of claim 1, wherein the plurality of power-controlled channels comprises a control channel and a data channel in a single component carrier.

9. The method of claim 1, wherein the plurality of power-controlled channels comprises two or more control channels in two or more component carriers.

10. The method of claim 1, wherein the plurality of power-controlled channels comprises two or more data channels in two or more component carriers.

11. The method of claim 1, wherein the maximum power level comprises a first maximum power level for the control channels and a second maximum power level for the data channels, wherein the first and second maximum power levels are different power levels.

12. The method of claim 1, wherein the maximum power level comprises a same power level for the data channels and the control channels.

13. An apparatus, comprising:
   a processor; and
   a memory comprising processor executable instructions that, when executed by the processor, configures the apparatus as a user equipment (UE) to:
   compare a total transmit power of a plurality of power-controlled channels with a maximum power level, wherein the plurality of power-controlled channels comprises control channels and data channels configured for parallel control and data transmission in an uplink subframe;
   look up an initial power backoff value to be subtracted from the maximum power level based at least in part on received power-frequency profile parameters of the control channels, when the total transmit power exceeds the maximum power level;
   iterate the power backoff value and power-scaling until a change in the power backoff value is less than a predefined threshold, an iterated power backoff value being based at least in part on iterated power-scaling, and wherein iterating the power backoff value is based at least in part on a priority of channels in the plurality of power-controlled channels; and
   adjust a transmit power of one or more channels in the plurality of power-controlled channels based on a result of iterating the power backoff value.

14. The apparatus of claim 13, wherein to look up the power backoff value, the apparatus is configured to determine one or more data channel backoff values, wherein the total transmit power is less than or equal to the maximum power level.

15. The apparatus of claim 14, wherein to iterate the power backoff value, the machine is configured to iterate the one or more data channel backoff values until a differential improvement in a performance metric is less than a predetermined value.

16. The apparatus of claim 14, wherein to iterate the power backoff value, the apparatus is configured to iterate the one or more data channel backoff values until a performance metric is determined to be less than a predetermined value.

17. The apparatus of claim 14, wherein to adjust the transmit power, the apparatus is configured to scale the one or more data channels for transmission according to the last power backoff value iteration.

18. The apparatus of claim 13, wherein to look up the initial power backoff value is based on a performance metric associated with a power-frequency distribution of the plurality of power-controlled channels.

19. The apparatus of claim 13, wherein control channels are prioritized over data channels with uplink control information (UCI), which are prioritized over data channels without UCI.

20. The apparatus of claim 13, wherein the plurality of power-controlled channels comprises a control channel and a data channel in a single component carrier.

21. The apparatus of claim 13, wherein the plurality of power-controlled channels comprises two or more control channels in two or more component carriers.

22. The apparatus of claim 13, wherein the plurality of power-controlled channels comprises two or more data channels in two or more component carriers.

23. The apparatus of claim 13, wherein the maximum power level comprises a first maximum power level for the control channels and a second maximum power level for the data channels, wherein the first and second maximum power levels are different power levels.

24. A user equipment (UE) apparatus, comprising:
   means for comparing a total transmit power of a plurality of power-controlled channels with a maximum power level, wherein the plurality of power-controlled channels comprises control channels and data channels configured for parallel control and data transmissions in an uplink subframe;
   means for looking up an initial power backoff value to be subtracted from the maximum power level based at least in part on received power-frequency profile parameters of the control channels, when the total transmit power exceeds the maximum power level;
   means for iterating the power backoff value and power-scaling until a change in the power backoff value is less than a predefined threshold, wherein an iterated power backoff value is based on iterated power-scaling, and wherein iterating the power backoff value is based at least in part on a priority of channels in the plurality of power-controlled channels; and
   means for adjusting a transmit power of one or more channels in the plurality of power-controlled channels based on a result of iterating the power backoff value.

25. The apparatus of claim 24, wherein the means for determining the power backoff value comprises means for determining one or more data channel backoff values, wherein the total transmit power is less than or equal to the maximum power level.

26. The apparatus of claim 25, wherein the means for iterating the power backoff value comprises means for iterating the one or more data channel backoff values until a differential improvement in a performance metric is less than a predetermined value.

27. The apparatus of claim 25, wherein the means for iterating the power backoff value comprises means for iterating the one or more data channel backoff values until a performance metric is determined to be less than a predetermined value.

28. The apparatus of claim 25, wherein the means for adjusting the transmit power comprises means for scaling the one or more data channels for transmission in relation to a power level corresponding to the last power backoff value iteration.

29. The apparatus of claim 24, wherein the power backoff value is based on a performance metric associated with a power-frequency distribution of the plurality of power-controlled channels.

30. The apparatus of claim 24, wherein control channels are prioritized over data channels with uplink control information (UCI), which are prioritized over data channels without UCI.

31. The apparatus of claim 24, wherein the plurality of power-controlled channels comprises a control channel and a data channel in a single component carrier.

32. The apparatus of claim 24, wherein the plurality of power-controlled channels comprises two or more control channels in two or more component carriers.

33. The apparatus of claim 24, wherein the plurality of power-controlled channels comprises two or more data channels in two or more component carriers.

34. The apparatus of claim 24, wherein the maximum power level comprises a first maximum power level for the control channels and a second maximum power level for the data channels, wherein the first and second maximum power levels are different power levels.

35. The apparatus of claim 24, wherein the maximum power level comprises a same power level for the data channels and the control channels.

36. An article of manufacture, comprising:
a non-transitory machine-readable medium having instructions therein that, when executed by a machine, configure the machine as a user equipment (UE) to:
compare a total transmit power of a plurality of power-controlled channels with a maximum power level, wherein the plurality of power-controlled channels comprise control channels and data channels configured for parallel control and data channel transmission in an uplink subframe;
look up an initial power backoff value to be subtracted from the maximum power level based at least in part on received power-frequency profile parameters of the control channels, when the total transmit power exceeds the maximum power level;
iterate the power backoff value and power-scaling until a change in the power backoff value is less than a predefined threshold, an iterated power backoff value being based at least in part on iterated power-scaling, and wherein iterating the power backoff value is based at least in part on a priority of channels in the plurality of power-controlled channels; and
adjust a transmit power of one or more channels in the plurality of power-controlled channels based on a result of iterating the power backoff value.

* * * * *